United States Patent
Calle et al.

[11] Patent Number: 5,985,995
[45] Date of Patent: Nov. 16, 1999

[54] PROCESS FOR PRODUCING HYDROGENATED RUBBERS

[75] Inventors: Juan Antonio Barrio Calle, Madrid; Maria Dolores Parellada Ferrer, Coslada; Maria Jose Espinosa Soriano, Santander, all of Spain

[73] Assignee: REPSOL QUIMICA, S.A., Madrid, Spain

[21] Appl. No.: 08/879,632

[22] Filed: Jun. 20, 1997

[51] Int. Cl.$^6$ ............... C08C 19/02; C08F 6/02; C08F 297/02

[52] U.S. Cl. .............. 525/52; 525/314; 525/332.3; 525/332.9; 525/333.1; 525/333.2; 525/338

[58] Field of Search ............... 525/314, 332.9, 525/333.1, 333.2, 338, 52, 332.3

[56] References Cited

U.S. PATENT DOCUMENTS

| | | | |
|---|---|---|---|
| 4,673,714 | 6/1987 | Kishimoto | 525/314 |
| 4,849,481 | 7/1989 | Rhodes | 525/314 |
| 5,017,660 | 5/1991 | Hattori | 525/314 |
| 5,242,986 | 9/1993 | Gibler . | |
| 5,266,647 | 11/1993 | Bender | 525/314 |
| 5,310,814 | 5/1994 | Struglinsky | 525/314 |

FOREIGN PATENT DOCUMENTS

| | | |
|---|---|---|
| 0423571A1 | 4/1991 | European Pat. Off. . |
| 0601953A1 | 6/1994 | European Pat. Off. . |
| 01271045 | 4/1972 | United Kingdom . |
| 01355342 | 6/1974 | United Kingdom . |

*Primary Examiner*—David Buttner
*Attorney, Agent, or Firm*—Gary Pisner

[57] ABSTRACT

Process for producing hydrogenated rubbers which allows an easy and effective deactivation of the living polymer before the hydrogenation step. The deactivation of living polymer is carried out using compounds with very good solubility in water of formula R—OH, R—COOH or compound of type $R'_n$—Si—$Cl_{4-n}$, $R'_n$—Sn—$Cl_{4-n}$, with n comprised between 0 and 3, extremes included; wherein R is a $C_2$–$C_{20}$ alkyl group optionally containing one or more polar functional groups selected from C—OH, COOH, and R' is a $C_1$–$C_{20}$ alkyl or $C_6$–$C_{20}$ aryl. The catalysts used in the hydrogenation of the deactivated polymer are titanocene compounds, being the most preferred those of formula $Cp_2$ Ti $(PhOCH_3)_2$ and $Cp_2$ Ti $(CH_2PPh_2)_2$.

6 Claims, No Drawings

PROCESS FOR PRODUCING HYDROGENATED RUBBERS

The present invention relates to a process for producing hydrogenated rubbers. More particularly it relates to a process for producing hydrogenated rubbers which allows an easy and effective deactivation of the living polymer before the hydrogenation step.

STATE OF THE ART.

Polymers having olefinic double bonds are quite common in the rubber industry. The presence of the insaturation allows vulcanization of the polymer, but reduces weather resistance. For this reason rubbers are often hydrogenated. The process for the production of hydrogenated rubbers is commonly carried out according to the following process:
  polymerization of the monomers by using known polymerization methods, such as anionic polymerization, cationic polymerization, coordination polymerization, radical polymerization, etc., by emulsion, solution or bulk process;
  the obtained polymer is treated with water for deactivating the catalyst and purifying the polymer while evaporating the solvent;
  the polymer is dried and dissolved in an inert solvent wherein it is hydrogenated by using a proper catalyst.

This method results in a very good quality of polymer but is quite expensive. In fact it requires the evaporation of the solvent used in the polymerization step and the polymer, before hydrogenation, requires a careful drying step. Since the solvent used in the polymerization step can also be used in the hydrogenation step, it has been proposed to make the hydrogenation over the living polymer (U.S. Pat. No. 4,501, 857). However this method presents the disadvantage that the polymer, still being reactive, can continue to polymerize under conditions which are not controlled and can undergo side-reactions which impair the quality of the final product. Furthermore the viscosity of living polymers is quite high and requires a high energy input.

It has been also proposed to deactivate the living polymer by reacting with hydrogen (U.S. 5039755, E.P. 0549063), the disadvantages of this method are the time needed for complete reaction of the hydrogen, it is said 20 minutes, and the need to adjust the amount of LiH formed, too small for high molecular weight and too high for low molecular weight.

It has been surprisingly found by the Applicants that it is possible to obtain a hydrogenated polymer presenting very good properties and, at the same time, reducing remarkably process costs, with a simple catalyst system.

DESCRIPTION OF THE INVENTION

The process of the present invention is characterized by the following steps:
  a) polymerization in solution of the monomers in the presence of a lithium alkyl to produce (co)polymers of conjugated dienes
  b) addition to the reaction mixture of a deactivating compound selected from the following classes: R—OH, R—COOH, $R'_n$—Si—$Cl_{4-n}$, $R'_n$—Sn—$Cl_{4-n}$, with n comprised between 0 and 3, extremes included, in an amount of equivalents which is at least equal to the amount of polymerization catalyst, wherein R is a $C_2$–$C_{20}$ alkyl group optionally containing one or more polar functional groups selected from C—OH, COOH and such that the compound has a solubility in water/solubility in hydrogenation solvent ratio higher than 49, and/or boiling point higher than 110° C.; R' is a $C_1$–$C_{20}$ alkyl or $C_6$–$C_{20}$ aryl.
  c) hydrogenation of the deactivated polymer by adding to the mixture a hydrogenation catalyst and maintaining the mixture under hydrogen pressure, in a continuous, semicontinuous or batch manner, using stirred, tubular or loop reactors.

The polymers or copolymers of conjugated dienes produced in step a) have preferably an average molecular weight comprised between 500 and 1,000,000. Copolymers of a conjugated diene such as 1,3-butadiene or isoprene, with vinylaromatic compounds such as styrene and a-methylstyrene are preferred. These polymers include statistic copolymers wherein the comonomers are distributed randomly along the polymer chain, the insertion copolymers and the pure or gradual block copolymers.

The block copolymers are especially interesting since some of them are thermoplastic elastomers useful from the industrial point of view. Such block copolymers consist of
  a) at least one polymer block A obtained by polymerizing an aromatic hydrocarbon containing a vinyl group, such as styrene and a-methylstyrene and
  b) at least one polymer block B obtained by polymerizing a conjugated diene such as 1,3-butadiene or isoprene.

The block copolymers preferably used in the present invention are those containing from 10 to 90 wt. % of vinylaromatic hydrocarbon. Particularly preferred are those copolymers whose content of 1,2-vinyl bonds in the conjugated diene unit is comprised between 25 and 75 wt. %. When block copolymers of these characteristics are hydrogenated, the polydiene blocks are converted into polyolefin blocks that behave like thermoplastic elastomers of great industrial value.

In step b) the deactivating compound R—OH or R—COOH has preferably a very good solubility in water and/or a boiling point higher than 110° C. When the compound R—OH or R—COOH satisfies these conditions, it is easy to separate from the polymerization-hydrogenation solvent. Preferred alcohol as deactivating compounds are ethylene glycol and 2-methyl-2,4-pentanediol.

When the deactivating compound is selected from compounds of formula $R'_n$—Si—$Cl_{4-n}$, $R'_n$—Sn—$Cl_{4-n}$, it remains bond to the polymer chain, and, by using compounds containing more than 2 chlorine atom, it is possible to prepare star polymers.

In step c) it is possible to use any catalyst that can selectively hydrogenate olefinic double bonds without hydrogenating the aromatic ring, when present. Preferred catalysts are titanocene compounds as described for example in EP-A-601 953, EP-A-545 844, U.S. Pat. No. 4,673,714 and U.S. Pat. No. 4,501,857 whose disclosure is herein incorporated by reference. The most preferred catalysts are those of formula $Cp_2Ti(PhOR)_2$ and $Cp_2Ti(CH_2PPh_2)_2$. These catalysts do not require the use of a cocatalyst and still present a very high activity and selectivity in the hydrogenation of olefinic double bonds.

In the process described in the present invention, the compound formed in the deactivating step by the reaction of the active lithium does not interfere with the hydrogenation catalyst activity. The amount of this compound formed is depending of the molecular weight of the polymer, so the hydrogenation process of this invention is not affected by the molecular weight of the polymer to be hydrogenated.

The use in this invention of terminated polymer allows to store the polymer under inert atmosphere because the hydrogenation step is not affected by the time passed since the polymerization step. This fact is advantageous from the industrial point of view, giving the process higher flexibility.

The products of hydrogenation may be readily separated from the solvent used by means of known processes such as distillation, precipitation, etc. In particular, the partially or completely hydrogenated polymers and copolymers may be separated from the solvent by the following methods:

1) By contacting the hydrogenated solution with a polar solvent such as acetone, methanol and the like, which, by being a poor solvent of the polymer, causes precipitation of the latter and permits its physical separation.

2) By contacting the hydrogenated solution with water and steam and eliminating the solvent by evaporation, separating the water and drying the polymer.

3) By direct evaporation of the solvent.

The process for the preparation of hydrogenated rubbers according to the invention is hereunder illustrated by way of examples.

EXAMPLES

Polymers to be hydrogenated were prepared by anionic polimerization in a ciclohexane/n-hexane mixture, using n-buthyllithium as polymerization initiator, and tetrahydrofurane as polar modifier. The monomers used were styrene and 1,3-butadiene. Samples were drawn from the polymer cement to analyse. The analytic determinations made were: percentage of butadiene, styrene, 1,2 vinyl bonds content and average molecular weight.

All hydrogenations were carried out in stirred reactor, sparging hydrogen through the polymer solution. Said solution is in all cases the resultant from polymerization step without any treatment. The hydrogenation catalysts used in the examples were $Cp_2Ti(PhOCH_3)_2$ or $Cp_2Ti(CH_2PPh_2)_2$ and were added to the reactor in solution in a ciclohexane/tetrahydrofuran mixture.

The hydrogenation reactions were followed by the hydrogen flow rate demanded by the reaction, when this rate is zero, the reaction is completed. The final percentage of hydrogenation is measured by Proton Nuclear Magnetic Resonance ($^1$H-NMR). Percentages of hydrogenation are referred to the polybutadiene fraction, the hydrogenation of the aromatic rings of the polystyrene fraction were not observed in any case.

The hydrogenated polymers are recovered from the solution by means of coagulation in a water-steam mixture, recovering by evaporation and later condensation the solvent of the reaction. Afterwards the polymers were dried.

Example 1

Hydrogenation of a Low Molecular Weight Polymer Terminated with 2-methyl-2,4-pentanediol.

In a two liter reactor a polystyrene-polybutadiene-polystyrene (SBS) copolymer were prepared in a 10% weight concentration. The deactivation of the living polymer were made by adding 2-methyl-2,4-pentanediol in a molar ratio alcohol/Li active=0,5, so that all the lithium atoms remains inactive. The reaction is complete in less than 1 minute. The polymer had a styrene content of 27% by weight, a 1,2 polybutadiene content of 40,4% (over total polybutadiene) and a average molecular weight in number ($M_n$) of 48200.

This solution is heated up to 90° C., initial temperature of hydrogenation reaction, 0,25 mmol of hydrogenation catalyst per 100 g of polymer is added and the reactor is pressurized to 8 kg/cm$^2$ of hydrogen. The hydrogen uptake is complete in 45 minutes. The percentage of hydrogenation reached is 99,6%.

Example 2

Hydrogenation of High Molecular Weight Polymer Terminated with 2-methyl-2,4-pentanediol.

In a 20 l reactor, a SBS copolymer is prepared in a 10% weight concentration in the same maner as example 1, but with the necessary amount of polymerization initiator to become a high molecular weight polymer. The analysis of polymer gives a 35,5% weight of styrene, a vinylic addition in polybutadiene of 42,4% and a molecular weight Mn=190800.

The hydrogenation reaction is initiated at 100° C., being the hydrogenation catalyst amount used 0,15 mmol per 100 g polymer and hydrogen pressure of 15 kg/cm$^2$. The total reaction time was 62 min and the percentage of hydrogenation reached 99,9%.

Example 3

Hydrogenation of a Polymer Finished with Ethylene Glycol.

In a 20 l reactor is prepared a SBS copolymer as in example 1 except that the deactivating compound was ethylene glycol in a molar ratio ethylene glycol/active lithium=0,5, so that no active lithium remains in polymer. The polymer concentration was 17% weight. The content of styrene was 29,7% weight, the 1,2 polybutadiene over total polybutadiene was 38,9% and the molecular weight Mn=73280.

Over this polymer solution is carried out the hydrogenation reaction at a pressure of hydrogen of 15 kg/cm$^2$, being the initial temperature 85° C. The reaction is completed after 45 min using a catlyst amount of 0,14 mmol per 100 g of polymer. The final percentage of hydrogenation was 99,8%.

Example 4

Hydrogenation of a Polymer Terminated with a Non-alcoholic Compound (chloro trimethyl silane).

A SBS copolymer was made in a 20 l reactor in the same way as example 1, except that the compound used for polymerization finishing was $(CH_3)_3$ SiCl in a molar ratio with the active lithium of 1. The polymer concentration was 10% weight. The polymer analysis showed a 27,2% of styrene content, 44,1% of 1,2 bonds in polybutadiene and a Mn of 58000.

The hydrogenation reaction of this polymer solution was initiated at 90° C., the pressure was mantained at 10 kg/cm$^2$, and a catalyst amount of 0,25 mmol/100 g polymer was used. After 75 min of reaction the hydrogenation level reached 99,1%.

Example 5

Hydrogenation of a Starshaped Polymer.

In a 2 l reactor, styrene and butadiene was sequentially polymerizated using n-buthyllithium as initiator and tetrahydrofurane as polar modifier to obtain a styrene-butadiene living copolymer, that is made to react with $Cl_4Si$ as coupling agent for 5 min, obtaining so a SBS copolymer with a star shape, with four arms. The polymer had 29,7% of styrene, 42,5% of vinyl content in polybutadiene and a Mn=93400. The percentage of coupling was 96,5%.

This polymer was hydrogenated in the same solution at a initial temperature of 90° C., 8 kg/cm$^2$ of hydrogen and 0,25 mmol of hydrogenation catalyst per 100 g of polymer. The reaction time was 40 minutes. The hydrogenation percentage was 99,8%. The hydrogenated polymer had the same molecular distibution of the initial polymer, without any uncoupling.

We claim:

1. Process for producing a hydrogenated rubber, comprising:
   a) polymerizing in a reaction mixture of one or more monomers in the presence of a lithium alkyl to produce polymers or copolymers of conjugated dienes;
   b) adding to said reaction mixture in an amount of equivalents, which is approximately equal to the amount of polymerization catalyst, a deactivating compound selected from the following classes: R—OH, R—COOH, $R'_n$—Si—$Cl_{4-n}$ and $R'_n$—Sn—$Cl_{4-n}$, wherein n is an integer from 1 to 3;
   wherein R is a $C_2$–$C_{20}$ alkyl group optionally containing one or more polar functional groups selected from C—OH, and COOH;
   wherein said deactivating compound has a solubility in water/solubility in hydrogenation solvent ratio higher than 49 and a boiling point higher than 110° C.;
   wherein, R' is $C_1$–$C_{20}$ alkyl or $C_6$–$C_{20}$ aryl; and
   c) hydrogenating of the deactivated polymer by adding to the mixture a hydrogenation catalyst and maintaining the mixture under hydrogen pressure in a continuous, Semicontinuous or batch manner, using stirred, tubular or loop reactors.

2. The process according to claim 1, wherein said deactivating compound is selected from ethylene glycol and 2-methyl-2,4-pentanediol.

3. The process according to claim 1 or 2, wherein said copolymers are of conjugated diene such as 1,3-butadiene or isoprene, with vinylaromatic compounds.

4. The process according to claim 3, wherein a butadiene-styrene block copolymer is prepared.

5. The process according to claim 1, wherein the average molecular weight of said polymers are from 500 to 1000000.

6. The process according to claim 1, wherein said hydrogenation catalyst used is a titanocene compound, optionally in the presence of a cocatalyst.

* * * * *